May 26, 1970 J. D. CAPPUCCI 3,514,722

NETWORKS USING CASCADED QUADRATURE COUPLERS, EACH COUPLER HAVING A DIFFERENT CENTER OPERATING FREQUENCY

Filed July 2, 1968 2 Sheets-Sheet 1

INVENTOR
JOSEPH D. CAPPUCCI

BY Darby & Darby

ATTORNEYS

INVENTOR
JOSEPH D. CAPPUCCI
BY Darby & Darby
ATTORNEYS

United States Patent Office 3,514,722

Patented May 26, 1970

3,514,722

NETWORKS USING CASCADED QUADRATURE COUPLERS, EACH COUPLER HAVING A DIFFERENT CENTER OPERATING FREQUENCY

Joseph D. Cappucci, Wayne, N.J., assignor to Merrimac Research and Development, Inc., West Caldwell, N.J., a corporation of New York Filed July 2, 1968, Ser. No. 742,052
Int. Cl. H03h 7/04
U.S. Cl. 333—10 11 Claims

ABSTRACT OF THE DISCLOSURE

This invention relates to networks using a plurality of symmetrical quadrature coupler sections connected together in cascade to provide coupler and filter networks which are readily synthesized.

In the copending applications of Joseph D. Cappucci and Harold Seidel, Ser. No. 478,930, filed on Aug. 11, 1965, now Pat. No. 3,452,300 and Ser. No. 527,421, filed on Feb. 15, 1966, now Pat. No. 3,452,301, which are both entitled "Couplers," and both of which are assigned to the same assignee, quadrature couplers are disclosed which are formed of one or more sections, each section in itself being a symmetrical directive coupler with imposed conditions of duality. In the first of the foregoing applications, the couplers are of the multi-section type using lumped constant, frequency responsive components, i.e. capacitors and inductances. In the later filed application, single and multi-section couplers are disclosed using an inductance formed by two wires which are highly magnetically coupled and held in registration with each other. The main part of the capacitance for this latter type of coupler is provided by the inter-winding capacitance between the two wires of the inductance. Further, these couplers use inductive coupled wires which are considerably less than a quarter wave length long at the center point of the operating band. Due to the use of the inter-winding capacitance, and the relatively small amount of wire needed to produce the needed inductance, couplers can be constructed which are extremely small in size, the size being determined primarily by the amount of wire needed to provide the inductance. In the couplers described in both of these applications the coupler section or sections, operate as backward scattering type couplers.

The present invention is also related to networks using a plurality of quadrature type couplers, each of these coupler sections being symmetrical, directive and dual. The sections of the circuit networks of the present invention can use the sections of the coupler networks of the aforesaid patent applications as well as other types of symmetrical quadrature couplers, for example of the waveguide type. However, the quadrature coupler sections forming the networks of the present invention are connected in a forward coupling arrangement to each other to produce various types of networks. In the various embodiments of the invention two or more coupler sections are connected together in cascade, each section having a different center operating frequency. These couplers have wide operating frequency bandwidths. Where coupler networks are to be produced, the sections have at least one 180° phase shifting element between them. Where filter networks are to be produced, a phase shift element is or is not used depending upon the network function desired.

The networks of the present invention form excellent couplers having well controlled coupling properties over a substantially wide band of operation. Further, pairs of transmission lines of arbitrary length, including zero length, can be used to connect the individual sections together without effecting the response function. The latter also holds true with respect to filter networks constructed in accordance with the invention. Further, the network synthesis made possible by the present invention permits a wide variety of network functions to be synthesized with relative simplicity.

It is therefore an object of the present invention to provide circuit networks formed of a plurality of quadrature coupler sections, each of which section in itself is originally a symmetrical directive coupler having imposed conditions of duality.

A further object is to provide a quadrature coupler network in which a number of directive coupler sections are connected together with at least one phase reversing connection between them.

Another object is to provide circuit networks formed by a plurality of quadrature coupler sections connected in cascade each of the sections having a different center frequency of operation.

An additional object is to provide a filter network formed by a plurality of quadrature coupler sections connected in cascade.

Other objects and advantages of the present invention will become more apparent upon reference to the following specification and annexed drawings in which.

Figure 1:
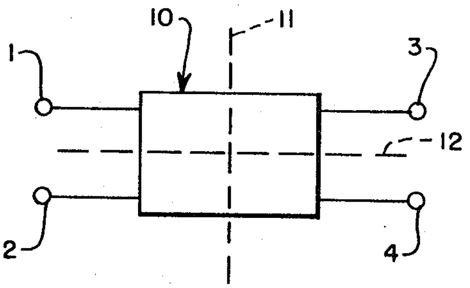
FIG. 1 shows a typical four terminal, symmetric, directive coupler network in block form.

FIG. 1 shows in general block notation a symmetric four terminal directive coupler section 10 having components (not shown) which are frequency responsive. The symmetric network has four ports 1, 2, 3 and 4 and is of the type such that when an input signal is applied to port 1, a coupled output signal is produced at port 2, a transmitted output signal produced at port 3 in phase quadrature with the signal at port 2, and port 4 is isolated so that no output signal appears thereon. The network is symmetrical about both a transverse symmetry plane 11 and a longitudinal symmetry plane 12. Many such networks are well known in the art.

Since network 10 is symmetrical it can be analyzed, acording to one theory, about the longitudinal plane of symmetry 12, in terms of even mode and odd mode bisections of the networks and their equivalent circuits. In the even mode bisection a voltage of +½ v. and +½ v. is considered to be applied to ports 1 and 2 and plane 12 is considered to be an open circuit reference to both input ports 1 and 2. In the odd mode bisection a voltage of +½ v. and —½ v. is considered to be applied to ports 1 and 2 and plane 12 is considered to be a short circuit reference to both input ports 1 and 2.

By imposing a condition of duality on the network 10 such that $z_{in_e}=y_{in_o}$, where $z_{in_e}$ is the normalized input impedance for the even mode bisection of network 10 (where the normalized input impedance equals the input impedance of the network at any one frequency divided by the characteristic input impedance of the network) and $y_{in_o}$ is the normalized input admittance for the odd mode bisection of network 10 (where the normalized input admittance equals the input admittance at a specific frequency multiplied by the characteristic input impedance of the network). It can be shown by network analysis that the scattering coefficients for the symmetric network 10 are:

(1) $$S_{11}=0$$
(2) $$S_{12}=V\Gamma_e$$
(3) $$S_{13}=V[1-\Gamma_e^2]^{1/2}$$
(4) $$S_{14}=0$$

Where V is the input voltage and $\Gamma_e$ is the reflection coefficient in the even mode bisection, and $[1-\Gamma_e^2]$ is equal to $T_e^2$, where $T_e$ is the transmission coefficient in the even mode. Equations 1 through 4 define a class of networks which are called "backward scattering directional couplers."

With an input V to port 1, Equations 1 through 4 completely define the symmetric network 10 of FIG. 1 as a directional coupler having the following characteristics:

(a) isolation (between ports 1 and 4). Since $S_{14}=0$ there is no signal transmission between ports 1 and 4.

(b) input match (at port 1). Since $S_{11}=0$ there is no mismatch at the port 1 input.

(c) coupled output (between ports 1 and 2) of $\Gamma_e$. Since $S_{12}=V\Gamma_e$ defines the coupling between ports 1 and 2.

(d) transmission (between ports 1 and 3) of $$[1-\Gamma_e^2]^{1/2}$$

The term $S_{13}=V[1-\Gamma_e^2]^{1/2}$ defines the transmission between ports 1 and 3.

The coupled output at port 2 can be shown to be in phase quadrature with the transmitted output at port 3. All of the foregoing is described in detail in the aforesaid copending applications.

Figure 2:
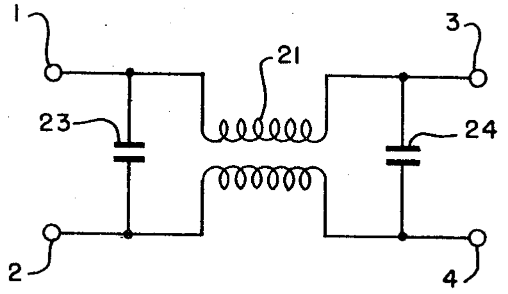
FIG. 2 is a schematic diagram of one form of a four-terminal symmetric network according to FIG. 1.

One type of symmetrical, dual, directive network of the type discussed above with respect to FIG. 1 can be constructed in the manner shown in FIG. 2. Here, the inductance 21 is of the two conductor type with one end of each wire being connected to a respective port of the network. Ports 1 and 2 are shown shunted by a capacitance 23 and ports 3 and 4 shunted by a capacitance 24. The conductors of the inductance 21 are highly magnetically coupled to each other. They can be wound as a bifilar winding on a toroid or coil form of high permeability magnetic material. They also can be twisted together or otherwise held in registration. In this case a high permeability core also can be used, if desired. As one way of holding the two wires in registration, they can be printed on a printed circuit board or deposited on a substrate using suitable thin film or micro-circuit techniques.

The capacitance represented by the elements 23 and 24 can be of the lumped constant type. At high frequencies, where registered conductors are used to form the inductance, the interwinding capacitance is usually sufficient to form all, or substantially all, of the needed capacitance.

The symmetrical, directive network of FIG. 2 can be analyzed by the bisection technique and shown to have the following properties:

(5a) $$S_{12}=\frac{jx}{2+jx}$$

(5b) $$S_{13}=\frac{2}{2+jx}$$

(5c) $$S_{11}=S_{14}=0$$

In the coupler described by Equations *5a* and *5b* and shown in FIG. 2, the conditions of duality are imposed and it is assumed that the inductance 21 is of the bifilar type. In bifilar type inductances the odd mode inductance is significantly less than the even mode inductance and can, in most cases, be disregarded. The even mode inductance $L_e$ is obtained from a shunt connection of the two conductors forming the total inductance, where the total parallel connected inductance is $L_s$ so that $$L_e=2L_s \qquad (5.1)$$

In an even mode bisection, the capacitance value does not appear since the conductors are excited in parallel, so that no capacity can exist between them. In an odd mode bisection, the odd mode capacity $C_o$ is twice the total capacity between the conductors $C_t$, since $C_o$ is the capacity of one conductor to the short circuit reference 12. In most cases the odd mode inductance is small enough to be neglected.

Imposing the aforementioned condition of duality on the network such that the normalized input impedance for the even mode bisection is equal to the normalized input admittance for the odd mode bisection gives:

$$Z_o\omega(C_o)=\frac{\omega(L_e)}{Z_o} \qquad (5.2)$$

or $$\frac{L_e}{C_o}=Z_o^2 \qquad (5.3)$$

Thus in Equations *5a* and *5b*

$$x=\frac{\omega L_e}{Z_o} \qquad (5.4)$$

where:

$L_e$=the even mode inductance of one of the conductors from ports 1 to 2 or from ports 3 to 4.

$Z_o$=the characteristic impedance of the system in which the network operates.

The derivation of these equations is explained in greater detail in application Ser. No. 478,930.

Because the network of FIG. 2 is symmetric about both vertical and horizontal planes 11 and 12, the following relationships hold:

(5d) $$S_{12}=S_{21}=S_{34}=S_{43}=\frac{jx}{2+jx}$$

(5e) $$S_{13}=S_{31}=S_{24}=S_{42}=\frac{2}{2+jx}$$

(5f) $$S_{11}=S_{22}=S_{33}=S_{44}=0$$

(5g) $$S_{14}=S_{41}=S_{23}=S_{32}=0$$

Equations *5d* through *5g* are defined by a scatter matrix analysis which is reproduced below:

$$\begin{vmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{vmatrix} = \begin{vmatrix} 0 & S_{12} & S_{13} & 0 \\ S_{12} & 0 & 0 & S_{13} \\ S_{13} & 0 & 0 & S_{12} \\ 0 & S_{13} & S_{12} & 0 \end{vmatrix}$$

To form one type of symmetrical quadrature coupler network section which can be used in the networks of the present invention, the dual, symmetric network of FIG. 2 is first rotated schematically counter-clockwise by 90°. Starting from the upper left-hand corner the port numbers, in a clockwise direction, now becomes 3, 4, 2, 1. The ports 3 and 4 are then interchanged by lifting off the respective connected end of each of the windings of the inductor 21 and connecting them to the other port (i.e. 3 to 4 and 4 to 3). Flipping the resultant network in its entirety by 180° about its horizontal center line gives the network 20 shown in FIG. 3.

Figure 3:
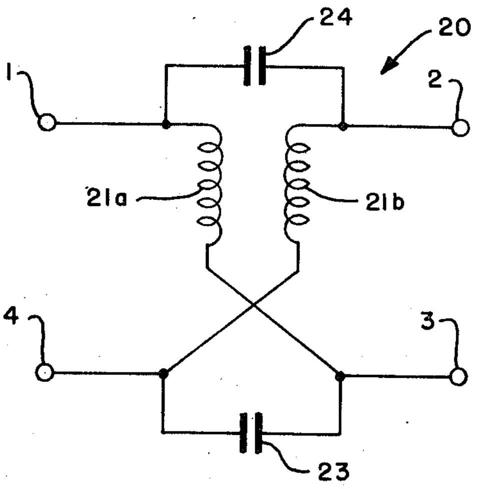
FIG. 3 is a schematic diagram of a quadrature coupler which can be used with the networks of the present invention.

The transformation of the coupler of FIG. 2 to that of FIG. 3 makes (schematically) the coupler 20 of FIG. 3 a symmetric "forward scatter" coupler as distinguished from the symmetric "backward scatter" coupler of FIG. 2. The symmetry referred to with respect to the coupler 20 of FIG. 3 is the port symmetry shown in Equations *5d* through *5g*. From Equations *5d* through *5g* it should be obvious that any port of the coupler 20 can be used as an input port with the output ports being on the opposite side of the coupler and the port adjacent to the input port being isolated.

The network 20 of FIG. 3 still has the same scattering parameters given in Equations 5*a* through 5*c*. Also the same relationships hold for L and C as given above with respect to the network of FIG. 2.

In accordance with the present invention, a plurality of the "forward scatter" coupler sections shown in FIG. 3 are connected together to produce circuit networks such as couplers and filters. Several coupler applications are discussed first.

Figure 4:
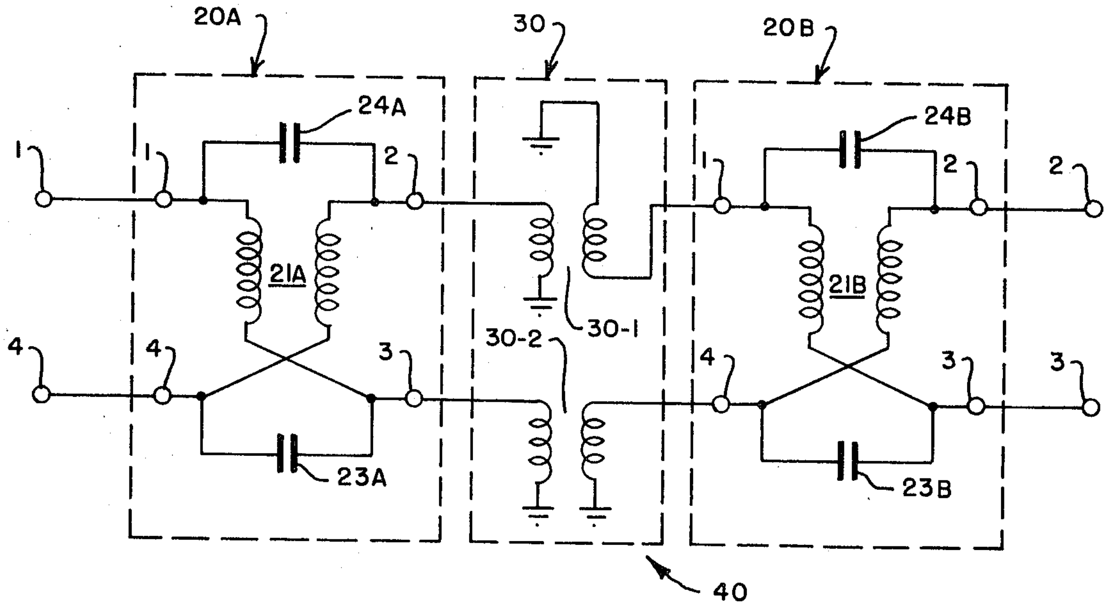
FIG. 4 is a schematic diagram of a two-section coupler network constructed in accordnace with the present invention.

FIG. 4 shows two of the coupler sections 20A and 20B of the type shown in FIG. 3 connected together by a phase inverting transformer 30 to form a quadrature coupler 40. Each of the network sections 20A and 20B is of the same construction as the section 20 of FIG. 3 and the same reference numerals are used for the components with the respective A and B suffixes. Ports 1 and 4 of section 20A and ports 2 and 3 of section 20B form the respective input and output ports for the coupler 40. Depending upon whether port 1 or 4 is used as the input port, the other would be isolated from the input and usually, although not necessarily, terminated in the characteristic impedance of the system. The phase inverting transformer 30 can be of any suitable type such as a balun anti-balun pair. A separate transformer 30–1 shown between port 2 of section 20A and port 1 of section 20B and transformer 30–2 between port 3 of section 20A and port 4 of section 20B. The transformer 30–1 produces the 180° phase reversal of the signal between the coupler sections 20A and 20B. The transformer sections 30–1 and 30–2 have the same residual phase so that a 180° phase differential is maintained between them. Any suitable phase reversing, or shifting, component or network can be used instead of the transformer 30, as long as the 180° phase differential is produced. For example, an LC network or one of the type described by B. N. Schiffman in IRE Transactions, Professional Group Microwave Theory and Techniques, April 1958, pages 232–237 "A New Class of Broad Band 90° Phase Shifters"; and S. B. Bedrosian in IRE Transactions, Professional Group Circuit Theory, June 1960, pages 128–136 "Normalized Design of 90° Phase Difference Networks."

From Equations 5*d* through 5*g* coupler section 20A is described by the following scattering parameters:

(6) $$S_{12A}=\frac{j\omega a}{2+j\omega a}$$

(7) $$S_{13A}=\frac{2}{2+j\omega a}$$

$$S_{11A}=S_{14A}=0$$

Coupler section 20B is described by:

(8) $$S_{12B}=\frac{j\omega b}{2+j\omega b}$$

(9) $$S_{13B}=\frac{2}{2+j\omega b}$$

$$S_{11B}=S_{14B}=0$$

For coupler section 20A in Equations 6 and 7, $$a=\frac{L_A}{Z_o}$$

where $L_A$ is the even mode inductance of one of the inductance windings of section 20A from ports 1 to 3 or 4 to 2 and $Z_o$ is the characteristic impedance of the system in which coupler 40 operates.

Similarly in Equations 8 and 9 for section 20B

$$b=\frac{L_B}{Z_o}$$

where $L_B$ is the even mode inductance of one of the inductance windings of section 20B from ports 1 to 3 or 4 to 2 and $Z_o$ is the characteristic impedance of the system in which coupler 40 operates.

For the total coupler network 40 shown in FIG. 3 the scattering parameters are:

(10) $$S_{12}=S_{13A}S_{13B}-S_{12A}S_{12B}$$

(11) $$S_{13}=S_{13A}S_{12B}-S_{12A}S_{13B}$$

and $$S_{11}=S_{14}=0$$

The minus sign between the two terms on the right-hand side of each of the Equations 10 and 11 occurs due to the 180° phase reversal provided by the transformer 30. The terms $S_{12}$ and $S_{13}$ apply between the input port 1 and the output ports 2 and 3 of the complete two section network, respectively.

If the phase shift from port 2A to port 1B is defined as $\theta+180°$ and the phase shift from port 3A to port 4B is defined as $\theta$, Where $\theta$ is the residual phase of the transformers plus the interconnecting line lengths, Then (10) can be written as:

$$S_{12}=S_{12A}e^{j(\theta+180°)}S_{12B}+S_{13A}e^{j\theta}S_{13B} \quad (10a)$$

and Equation 11 as:

$$S_{13}=S_{13A}e^{j\theta}S_{12B}+S_{13A}e^{j(\theta+180°)}S_{13B} \quad (11a)$$

Equations 10*a* and 11*a* can be rewritten as:

$$S_{12}=(S_{13A}S_{13B}-S_{12A}S_{12B})e^{j\theta} \quad (10b)$$

$$S_{13}=(S_{13A}S_{12B}-S_{12A}S_{13B})e^{j\theta} \quad (11b)$$

From Equations 10*b* and 11*b* it is seen that each output is equally shifted in phase and the line length $\theta$ is just a reference shift of both outputs having no effect on the phase differential between the outputs nor on the amplitude response of either output.

This condition holds for any number of coupler sections interconnected and, as such, will not be included in any further discussions.

Equations 10*a*, 10*b*, 11*a* and 11*b* show that the entire coupler is independent of the interconnecting line lengths between the respective coupler sections so long as the line lengths between adjacent sections are paired, i.e. have the same phase shift. This means that the pairs of line lengths can be of any arbitrary value, including zero. Also, the phase shift of a pair of line lengths can be selected to produce a desired overall phase shift for a given network. Pairs of line lengths between adjacent coupler sections can have different phase shift. In essence, this means that in the networks of the present invention that line lengths, and their resultant phase shift, are chosen as a matter of convenience rather than being imposed upon the network as a constraint. This gives the circuit designer greater flexibility.

Substituting Equations 6, 7, 8 and 9 into Equations 10 and 11 and neglecting the residual phase shift between sections gives:

(12) $$S_{12}=\frac{4+\omega^2ab}{(4-\omega^2ab)+j\omega(2a+2b)}$$

and

(13) $$S_{13}=\frac{j^2\omega(b-a)}{(4-\omega^2ab)+j\omega(2a+2b)}$$

Since the denominators at the equations for $S_{12}$ and $S_{13}$ are identical, and the numerators are in phase quadrature, then the phases at $S_{12}$ and $S_{13}$ are always in phase quadrature.

The loss function L between port 1 of coupler 40 and any other port is given by $$L=\frac{1}{|S|^2}$$

Between ports 1 and 2, from Equation 12 the loss function $L_{12}$ becomes:

(14) $$L_{12}=\frac{16+\omega^4a^2b^2-8\omega^2ab+\omega^2(4a^2+4b^2+8ab)}{16+8\omega^2ab+\omega^4a^2b^2}$$

$$L_{12}=1+\frac{\omega^2(4a^2+4b^2-8ab)}{16+8\omega^2ab+\omega^4a^2b^2}$$

$$L_{12}=1+\left(\frac{2\omega(b-a)}{4+\omega^2ab}\right)^2$$

Similarly, using (13) for the loss function $L_{13}$ between ports 1 and 3 of coupler 40 is expressed as:

(15) $$L_{13}=1+\left(\frac{4+\omega^2ab}{2\omega(b-a)}\right)^2$$

It should be noted that the numerator of (14) equals the denominator of (15) and the denominator of (15) equals the numerator of (14).

Rewriting $L_{13}$, as given by (15), in a slightly different form gives:

(16) $$L_{13}=1+\left(\frac{2}{\omega(b-a)}+\frac{\omega ab}{2(b-a)}\right)^2$$

To make the function $L_{13}$ have geometric symmetry in $$\omega\left(\text{i.e. } f(\omega)=f\left(\frac{1}{\omega}\right)\right)$$

then $ab=4$. Equation 16 now becomes

(17) $$L_{13}=1+\left(\frac{2}{b-a}\right)^2\left(\omega+\frac{1}{\omega}\right)^2$$

The function $L_{13}$ of Equation 17 has its minimum value at $\omega=1$, and at $\omega=1$, $L_{13}$ becomes

(18) $$L_{13}=1+\left(\frac{4}{b-a}\right)^2$$

The coupling C between ports 1 and 3, called $C_{13}$, of coupler 40 is expressed in db as:

(19) $$C_{13}\ (\text{db})=10\log_{10}[L_{13}]$$

As an example, for a 3 db coupler at $\omega=1$ $$\frac{4}{b-a}=1$$

and $ab=4$.

Since, for geometric symmetry in $\omega$, $ab=4$, then $$b=2[1+\Gamma 2]=4.82843 \qquad (19a)$$

and $$a=\frac{2}{(1+\Gamma 2)}=.82843 \qquad (19b)$$

Since $a$ and $b$ are the normalized inductive reactance values of the section 20A and 20B at $\omega=1$, the geometric center of a respective section, the inductance values $L_A$ and $L_B$ of the inductance 21 for the two sections can be readily calculated. Also, due to the original constraint of duality imposed upon the sections, the capacitance value for the capacitors 23 and 24 are given as, in bisection $$\sqrt{\frac{L}{C}}=Z_o$$

It should be recalled that the values of L and C are the bisection values given in Equations 5.2 and 5.3.

The loss function $L_{13}$, as a function of $\omega$ (for 3 db coupling at $\omega=1$) becomes:

(20) $$L_{13}=1+\left(\frac{\omega^2+1}{2\omega}\right)^2$$

Any coupling value can be synthesized by inserting the proper value for $b-a$ in Equation 18 to get the desired coupling and solving for $a$ and $b$ from,

(21) $$b-a=k$$

(22) $$ab=4$$

Where $|k|$ is greater than zero.

From (19$a$) and (19$b$) it is seen that the values of $a$ and $b$ are different for a 3 db coupler. This means that the section 20A and 20B will have different cross-over frequencies, i.e. the cross-over frequency being the point where $|S_{12}|=|S_{13}|$.

Figure 5:
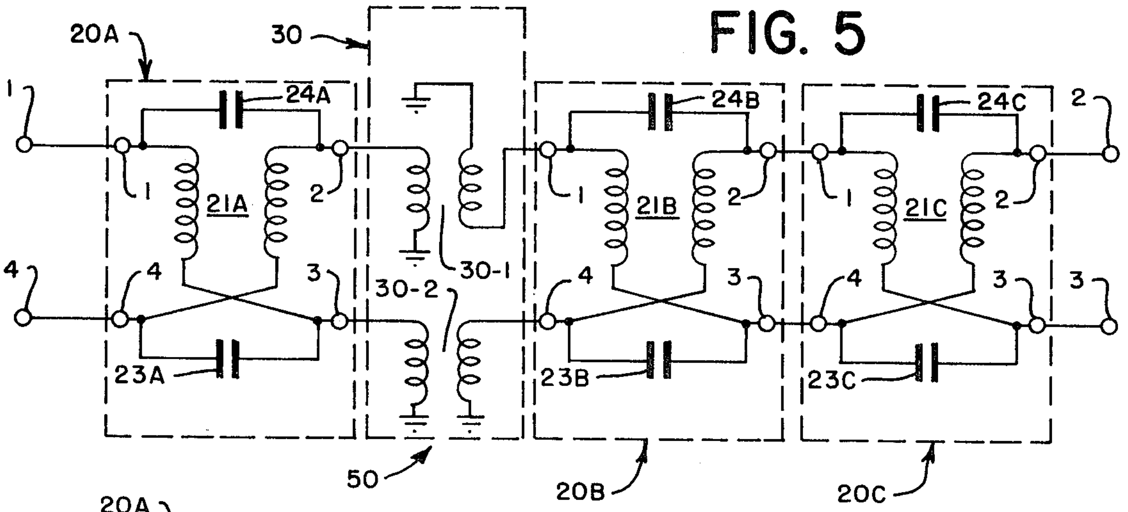
FIG. 5 is a schematic diagram of a three-section coupler network constructed in accordance with the present invention.

Couplers having more than two sections can also be synthesized and constructed using the techniques described above. FIG. 5 shows a coupler 50 using three sections of the type 20 shown in FIG. 3, designated 20A, 20B and 20C. The two 180° phase inverting networks 30–1 and 30–2 are connected respectively between ports 2 and 3 of section 20A and ports 1 and 4 of section 20B. There is a connection between port 2 of section 20B and port 1 of section 20C and port 3 of section 20B and port 4 of section 20C without a 180° phase inversion. The input ports for the complete coupler are ports 1 and 4 of section 20A while the output ports are ports 2 and 3 of section 20C.

The scattering parameters for section 20C are given as:

(23) $$S_{12_C}=\frac{j\omega c}{2+j\omega c}$$

(24) $$S_{13_C}=\frac{2}{2+j\omega c}$$

$$S_{11_C}=S_{14_C}=0$$

For coupler section 20C in Equations 23 and 24

$$c=\frac{L_c}{Z_o}$$

where $L_c$ is the series inductance of one of the inductance windings of section 20C from ports 1 to 3 or 4 to 2 and $Z_o$ is again the characteristic impedance of the system. The scattering parameters and the values for $a$ and $b$ of sections 20A and 20B remain as previously described in Equations 6 through 9.

The scattering parameters for the total coupler network 50 of FIG. 5 are:

(25)
$$S_{12}=S_{12_C}[S_{13_A}S_{13_B}-S_{12_A}S_{12_B}]+S_{13_C}[-S_{12_A}S_{13_B}+S_{12_B}S_{13_A}]$$

(26)
$$S_{13}=S_{12_C}[-S_{12_A}S_{13_B}+S_{12_B}S_{13_A}]+S_{13_C}[S_{13_A}S_{13_B}-S_{12_A}S_{12_B}]$$

The minus signs in the terms of Equations 25 and 26 are again due to the 180° phase shift produced by the network 30.

For the entire coupler 50, substituting for $S_{12_A}$, $S_{12_B}$, $S_{12C}$, $S_{13A}$, $S_{13B}$ and $S_{13C}$ e.g. (25 and 26) gives:

(27)
$$S_{12}=j\frac{4\omega(b+c-a)+\omega^3abc}{8-2\omega^2(ab+bc+ac)+j[4\omega(a+b+c)-\omega^3abc]}$$

and

(28)
$$S_{13}=\frac{8+2\omega^2(ab+ac-bc)}{8-2\omega^2(ab+bc+ac)+j[4\omega(a+b+c)-\omega^3abc]}$$

$S_{12}$ and $S_{13}$ are again in phase quadrature since their denominators are identical and their numerators are in phase quadrature.

Squaring the denominator of each of Equation 27 and 28 produces a quantity $|D|^2$ which can be factored into:

(29) $$|D|^2=[8+2\omega^2(ab+ac-bc)]^2+[\omega^3abc+4\omega(b+c-a)]^2$$

For the three section coupler the loss function $$L=\frac{1}{|S|^2}$$

for the ports 1 to 2 and 1 to 3 becomes from Equations 27 and 28:

(30) $$L_{12}=1+\left[\frac{8+2\omega^2(ab+ac-bc)}{4\omega(b+c-a)+\omega^3abc}\right]^2$$

(31) $$L_{13}=1+\left[\frac{4\omega(b+c-a)+\omega^3abc}{8+2\omega^2(ab+ac-bc)}\right]^2$$

The second term of the right-hand side of both Equations 30 and 31 for $L_{12}$ and $L_{13}$ are polynomials which can be designated as being of the general type $P_{in}^2(\omega)$. In the case of the three section network the function $P_{in}^2(\omega)$ can be made antisymmetric about $\omega=1$ so that:

$$P_{in}^2(\omega)=\frac{1}{P_{in}^2\left(\frac{1}{\omega}\right)} \tag{32}$$

In Equation 32, it should be noted from 30 and 31 that:

$$L_{in}(\omega)=1+P_{in}^2(\omega) \tag{33}$$

Solving 30 and 31 to get the anti-symmetric condition of 32 gives:

$$abc=8 \tag{34}$$

and $$4(b+c-a)=2(ab+ac-ac) \tag{35}$$

Solving 34 and 35 for $a$ gives:

$$a^2(2+b+c)-2a(b+c)-8=0 \tag{36}$$

which yields $$a=\frac{(b+c)\pm(4+b+c)}{2+(b+c)} \tag{37}$$

Since $a$, $b$ and $c$ must be positive quantities, one must choose the positive root, then $$a=2$$

Substituting the value of $a=2$ and $abc=8$ into Equations 30 and 31 gives:

$$L_{12}=1+\left[\frac{4+2\omega^2(b+c-2)}{2\omega(b+c-2)+\omega^3bc}\right]^2 \tag{38}$$

and $$L_{13}=1+\left[\frac{2\omega(b+c-2)+\omega^3bc}{4+2\omega^2(b+c-2)}\right]^2 \tag{39}$$

where $a=2$ and $bc=4$.

The quantities $b$ and $c$ can be solved for by conventional technique. For example, the polynomial portion of 38 can be differentiated and set equal to zero. Solving for $b+c$ as a function of $\omega$ we obtain $$b+c=\left(\omega+\frac{1}{\omega}\right)^2+\left[\left(\omega^2+\frac{1}{\omega^2}\right)^2+12\right]^{1/2}$$

and the maximum and minimum values of the loss functions can be obtained by substituting the values obtained for $b$ and $c$ at the value of $\omega$ chosen. (Since the function has geometric antisymmetry about $\omega=1$ the loss function at $1/\omega$ is also known.) Through the use of frequency scaling factors, the inductance of $a$, $b$ and $c$ can be scaled to the correct center frequency, and the capacitance can be found from 5.2 and 5.3.

It should again be noted that $a$, $b$ and $c$ are different quantities. This means that each coupler section 20A, 20B and 20C has a different center frequency.

As should be apparent, the synthesis of two systems of couplers has been described using quadrature couplers of the forward scatter type. The first being a system of even numbers of coupler sections, the second being a system of odd numbers of coupler sections. In both systems the loss functions $L_{12}$ and $L_{13}$ are always expressed by:

$$L_{12}=1+\frac{|S_{13}|^2}{|S_{12}|^2} \tag{40}$$

and $$L_{13}=1+\frac{|S_{12}|^2}{|S_{13}|^2} \tag{41}$$

The polynomials, $(P_{2n}(\omega))$ for the couplers formed by an even number of sections will always have geometric symmetry about $\omega=1$. And $S_{12}$ and $S_{13}$ are always in phase quadrature. The odd polynominals $(P_{(2n-1)}(\omega))$ for the couplers formed by an odd number of sections will always have geometric anti-symmetry about $\omega=1$. The $\omega$ quantities are normalized frequencies.

For couplers with an even number of sections, the polynominal will be of the following form:

$$P_{(2n)}(\omega)=\frac{M_1+M_3\omega^2+\dots+M_{(2i-1)}\omega^{2i}+\dots M_{(2n-1)}\omega^{2n}}{M_2\omega+\dots+M_{2i}\omega^{(2i-1)}+\dots M_{2n}\omega^{(2n-1)}} \tag{42}$$

where $i$ goes from 1 to $n$ and $M_1=M_{(2n1}$, $M_3=M_{(2n3)}$, $$M_{(2i-)}=M_{(2n-i)+1}, \text{ and } M=M_{2n}$$

$M_4=M_{(2n-2)}$, $M_{2i}=M_{2(n-i+1)}$. Where $n$ is the order of the polynomial (i.e. $n=1,2,3,\dots$) and $i$ is index of the term within the polynomial, and the number of elements required in $2n$.

For couplers with an odd number of sections, the polynomial will be of the following form:

$$P_{(2n-1)}(\omega)=\frac{M_1\omega+M_2\omega^3+\dots M_n\omega^{2(n-1)}}{M_n+M_{(n-1)}\omega^2+\dots M_1\omega^{2(n-1)}} \tag{43}$$

where $n$ is the order of the polynomial (i.e. $n=1, 2, 3\dots$) and the number of elements required is $$=(2n-1).$$

Figure 6A:
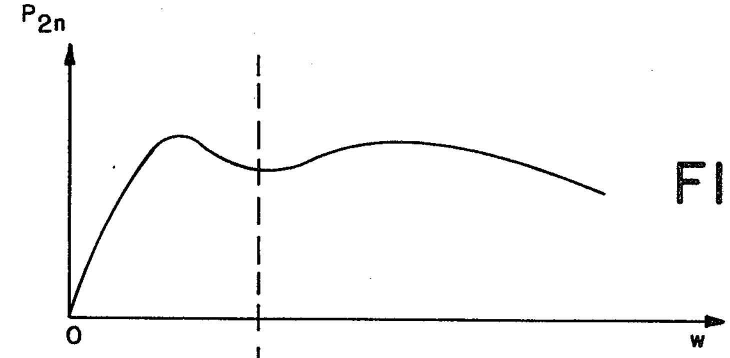
FIGS. 6A and 6B are graphical representations of the odd and even polynomial functions generated by the coupler networks built in accordance with the invention.
Figure 6B:
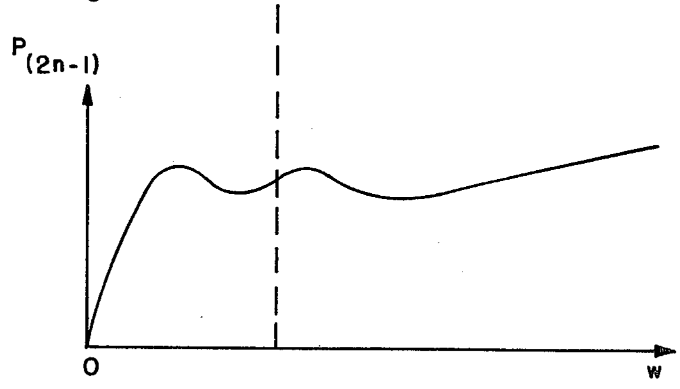

FIGS. 6A and 6B respectively show, diagrammatically, the polynomials of the form $P_{2n}$ and $P_{2n-1)}$. As should be apparent from the form of the curves of these two figures and Equations 42 and 43, which describe the even and odd number section couplers, the polynomials are of the rational Tschebyscheff type. It also should be apparent from 38 and 39 and the more generalized counterpart corresponding Equations 40 and 41 that the polynomial portions of the equations have poles and zeroes on the imaginary axis. This again verifies the conclusion that the networks constructed with at least one 180° phase shifting network between two coupler sections is a coupler.

It should be understood that while only one 180° phase shifting network 30 is shown in the networks of both FIGS. 4 and 5, that the more general statement holds that in any network of N coupler sections (e.g. the sections 20) up to $N-1$ 180° phase shifting networks (e.g. 30) can be used. This also includes even numbers of 180° phase shifting networks. The order of interconnection of the sections 20 determines the number of 180° phase shifters needed. At least one 180° phase shifter is needed to form a coupler network.

The polynomials described above are all 3 db couplers in the form analyzed. If the polynomials were rewritten in the form $$P_1(\omega)=kP(\omega) \tag{44}$$

and the elements recalculated, it can produce a coupler of any coupling value.

Figure 7:
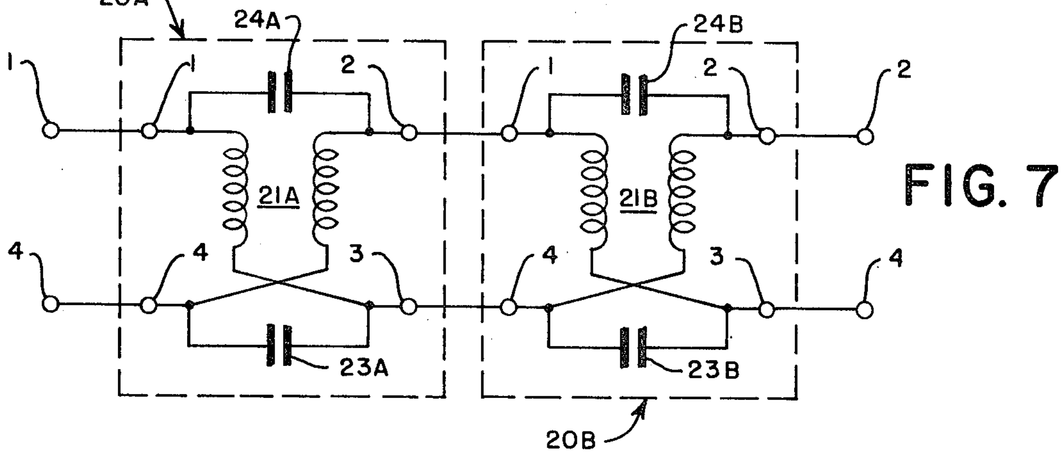
FIG. 7 is a schematic diagram of a filter network constructed in accordance with the invention.

The networks heretofore described are of the coupler type with at least one 180° phase shifting network. FIG. 7 shows another type of network formed by two coupler sections 20A and 20B of the type shown in FIG. 3 in which the sections are connected together without such a 180° phase shifting section. Here again, the coupler sections have a different center frequency. It can be shown by an analysis similar to that previously presented that the network of FIG. 7 will produce polynomial terms in the loss function where all $\omega$, $\omega^3$, $\omega^5$, $\omega^7$ . . . etc. terms are negative. It also can be shown that the poles and zeros of these polynomial terms lie on the real axis. This means that such networks are filters. These filters are of the directional type, i.e. the filter has two outputs. They also have a pass band and a stop band with one or more of such pass bands and stop bands being possible.

While it has been found preferable to construct filter networks according to the present invention without the use of 180° phase shifting networks, filters can be constructed using at least one such phase shifting network if there is a proper choice of the $a$, $b$, $c$, . . . etc. parameters.

The networks described previously use coupler sections 20 which are formed by elements at least one of which is lumped, that is, the inductance. However, the coupler sections do not have to be of this form. By proper insertion of the number and location of 180° sections, some or all of the real axis poles (or zeros) can be moved to the imaginary axis, leaving only those zeros (or poles) on the real axis that are desired, forming band-pass, high-pass, or low-pass functions with either rippled or monotonic passbands, or stop bands, as desired.

The coupler sections can be of any forward directional type, and the Equations 10 and 11 still hold, so that the loss function is still definable as 1 plus the ratio of $S_{12}$ to $S_{13}$ squared. In many cases this will not produce the geometric symmetry of the case cited, but will always produce a useful coupling structure.

Examples of other types of couplers that can be used are: short-slot couplers in waveguide connected by a pair of waveguides one of which is twisted 180° can form a coupling section; quarter wavelength backward couplers can be used with 180° sections to form a useful coupler section; any aperture coupled waveguide coupler can be interconnected with a 180° twist to form a useful coupler section. The same holds true for the coupler sections forming the filter networks.

What I claim is:

1. A frequency responsive network including:

first and second symmetrical four-port quadrature coupler sections, each of which is self dual and has a different center operating frequency for providing a quadrature signal at a first of said ports and an in-phase signal at a second of said ports in response to an input signal applied to a third of said ports; and means for connecting said first and second ports of said first coupler section to said third port and a fourth port respectively of said second coupler section.

2. The frequency responsive network as defined in claim 1 wherein said connecting means includes means for producing a relative 180° phase shift between signals appearing on said first and second ports of said first coupler section and said third and fourth ports of said second coupler section thereby providing a frequency responsive network in which the polynomial terms of the loss functions from the third port of the first coupler section to the first and second ports of the second coupler section have their poles and zeros on the imaginary axis rendering the frequency responsive network a quadrature coupler network.

3. The frequency responsive network as defined in claim 2 wherein said means for producing the 180° phase shift is a balun anti-balun pair.

4. The frequency responsive network as defined by claim 2 in which:

the characteristic impedance of said first and second coupler sections is $Z_o$;

$$Z_o^2=\frac{L_1}{C_1}=\frac{L_2}{C_2}$$

where $L_1$ and $L_2$ being one-half the symmetric mode inductance of said first and second coupler sections respectively and $C_1$ and $C_2$ being one-half the capacitance of the respective anti-symmetric modes.

5. The frequency responsive network as defined in claim 4 in which:

$$\frac{\omega_0^2 L_1 L_2}{Z_o^2}$$

is equal to four so that the network is symmetrical with respect to $\omega_0$.

6. The frequency responsive network as defined in claim 4 wherein said first and second couplers each comprises a pair of registered conductors tightly magnetically coupled to minimize leakage reactance; and capacitive coupling therebetween to provide said characteristic impedance of $Z_o$.

7. The frequency responsive network as defined in claim 2 also including:

a third symmetrical four-port quadrature coupler section which is self dual and has a different center operating frequency than said first and second coupler sections for providing a quadrature signal at a first of said ports and an in-phase signal at a second of said ports in response to an input signal applied to a third of said ports; and means for connecting said first and second ports of said second coupler section to said third port and a fourth port of said third coupler section respectively.

8. The frequency responsive network as defined by claim 7 in which the characteristic impedance of said first, second, and third coupler sections is $Z_o$; where $$Z_o^2=\frac{L_1}{C_1}=\frac{L_2}{C_2}=\frac{L_3}{C_3}$$

$L_1$, $L_2$, and $L_3$ being one-half the symmetric mode inductance of said first, second, and third coupler sections respectively and $C_1$, $C_2$, and $C_3$ being one-half the capacitance of the respective anti-symmetric modes; and $$\frac{\omega_o^3 L_1 L_2 L_3}{Z_o^3}$$

is equal to eight so that the network is symmetrical with respect to $\omega_0$.

9. The frequency responsive network as defined in claim 7 in which said first and second ports of each of said first, second, and third coupler sections are on the same side of said first, second and third couplers respectively.

10. The frequency responsive network as defined in claim 7 also including:

a plurality of additional symmetrical four-port quadrature coupler sections each of which is self dual and has a different center operating frequency from each other and from said first, second, and third coupler section for providing a quadrature signal at a first of said ports and an in-phase signal at a second of said ports in response to an input signal applied to a third of said ports; and means for connecting said plurality of additional coupler sections in cascade with one another and with said third coupler section.

11. The frequency responsive network as defined by claim 10 in which said connecting means includes 180° phase shifting networks.

References Cited

UNITED STATES PATENTS

| | | | |
|---|---|---|---|
| 2,922,123 | 1/1960 | Cohn | 333—10 |
| 3,184,691 | 5/1965 | Marcatili et al. | 333—11 |
| 3,252,113 | 5/1966 | Veltrop | 333—10 |

FOREIGN PATENTS

| | | |
|---|---|---|
| 1,146,559 | 4/1963 | Germany. |

HERMAN KARL SAALBACH, Examiner

PAUL L. GENSLER, Assistant Examiner

U.S. Cl. X.R.

333—70, 77